(12) United States Patent
Sonnier et al.

(10) Patent No.: US 11,598,439 B1
(45) Date of Patent: Mar. 7, 2023

(54) FLUID VALVE APPARATUS

(71) Applicant: AGI INDUSTRIES, INC., Lafayette, LA (US)

(72) Inventors: Bryan T. Sonnier, Lafayette, LA (US); Christopher F. Rooney, Gordonville, TX (US)

(73) Assignee: AGI INDUSTRIES, INC., Lafayette, LA (US)

( * ) Notice: Subject to any disclaimer, the term of this patent is extended or adjusted under 35 U.S.C. 154(b) by 0 days.

(21) Appl. No.: 17/689,190

(22) Filed: Mar. 8, 2022

(51) Int. Cl.
| *F16K 11/072* | (2006.01) |
| *F16L 57/06* | (2006.01) |
| *F16K 25/00* | (2006.01) |
| *F16K 27/00* | (2006.01) |
| *F16K 7/16* | (2006.01) |

(52) U.S. Cl.
CPC .............. *F16K 25/005* (2013.01); *F16K 7/16* (2013.01); *F16K 27/003* (2013.01); *F16K 11/072* (2013.01); *F16L 57/06* (2013.01)

(58) Field of Classification Search
CPC ...... F16K 11/072; F16K 3/0209; F16L 57/06; Y10T 137/5109; Y10T 137/5196
USPC .................................. 137/269, 270; 138/36
See application file for complete search history.

(56) References Cited

U.S. PATENT DOCUMENTS

| 1,321,132 | A | * | 11/1919 | Skinner | .................... | F02M 1/16 |
| | | | | | | 261/50.1 |
| 4,735,229 | A | * | 4/1988 | Lancaster | ................ | G01M 3/04 |
| | | | | | | 251/363 |
| 4,874,007 | A | * | 10/1989 | Taylor | ..................... | G01L 19/12 |
| | | | | | | 116/272 |
| 10,941,870 | B1 | * | 3/2021 | Sonnier | ................... | F16K 35/00 |

* cited by examiner

*Primary Examiner* — Michael R Reid
(74) *Attorney, Agent, or Firm* — Ted M. Anthony

(57) ABSTRACT

A valve having a flow trim assembly that can be quickly and efficiently removed and repaired or replaced. A body section having a central through bore that defines an inlet, an inner chamber or space, and two selectable outlets. Further the selectable outlets can direct flow in either a 90 degree "angle" orientation or at straight "in-line" orientation. An actuator stem extends into the inner chamber. A first (movable) trim member is attached to the rotator, and can be selectively rotated relative to a second (fixed) trim member. The first and second trim members cooperate to adjust flow opening through the valve. A valve bonnet that allows direct coupling of an actuator to the valve.

20 Claims, 19 Drawing Sheets

DETAIL A

DETAIL B

SECTION C-C

SECTION D-D

SECTION E-E

FLUID VALVE APPARATUS

BACKGROUND OF THE PRESENT INVENTION

1. Field of the Invention

The present invention pertains to valves used to control and/or interrupt the flowing pressure and flow rate of a fluid flowing through a pipeline, flow line or other fluid conduit. More particularly, the present invention pertains to a modular valve that is compact, robust, durable and efficient.

2. Description of Related Art

Valves of different types are used to control and/or interrupt the flow of fluids. Ideally, valves should be effective, have long life spans and should be easy to operate and maintain. Valve failures can be dangerous, environmentally undesirable, and costly; as a result, valves should be durable and should be able to withstand environmental and operational conditions, which can frequently be severe.

Certain valve assemblies can be used to restrict fluid flow rate and/or reduce the pressure of a fluid stream flowing in a pipe, flow line or other conduit. Such a valve assembly typically has a means for selectively adjusting or varying the amount of restriction imposed on any fluid flowing through the valve. These valve assemblies generally comprise some combination of the following components:

(1) a valve body defining an inlet, an outlet and at least one flow bore extending through said body from said inlet to said outlet;

(2) a "flow trim" assembly mounted within said through bore between said inlet and said outlet, for controlling the fluid flow rate of fluid in said through bore; and (3) an actuator for selectively manipulating (typically, opening and closing) said flow trim assembly.

Multiple-port-disk flow trims typically comprise a first ported disk having at least one orifice fixedly mounted within the through bore of a valve body. A second ported disk having at least one orifice is rotatably disposed in contiguous—and substantially parallel—relationship to said fixed ported disk. Said second disk can be selectively re-positioned relative to said first disk, thereby causing the ports (orifices) of the respective disks to move into or out of alignment with each other, as desired. By selectively adjusting the amount of overlapping port/orifice area that is open to fluid flow, said cooperating disks can be used to adjust the size of the restriction (and corresponding opening) in said through bore.

Frequently, valves can often be exposed to very severe conditions, particularly during use in the oil and gas industry and related applications. Well production fluids frequently contain solids (such as sand-like mineral particles or other debris), brine, and acids. The erosive and corrosive characteristics of such produced well fluids in valves can be aggravated by the effects of increased fluid turbulence, impingement on metal surfaces. Such damaging fluid flow conditions can negatively impact the operation, performance and/or longevity of said valves, including valves having multiple-port-disks. Unfortunately, conventional means to address or overcome such challenges have not been completely successful.

Thus, there is a need for an improved valve that can overcome many of the limitations of conventional valve assemblies. Said improved valve should be compact, robust, durable and efficient, while permitting actuation through use of either manual handles or automatic actuators.

SUMMARY OF THE INVENTION

The present invention comprises a valve that addresses the erosion, corrosion, and other operational problems commonly encountered with conventional valves. In a preferred embodiment, the valve assembly of the present invention generally comprises a valve body member having a bore extending through said body member from an inlet to an outlet and defining an inner flow trim chamber.

A valve rotator is rotatably disposed within said inner flow trim chamber. A first ported disk having at least one orifice is fixedly disposed within said flow trim chamber, while a second ported disk having at least one orifice is rotatably disposed adjacent to said fixed ported disk. Said second disk can be selectively re-positioned relative to said first disk, thereby causing the ports (orifices) of the respective disks to move into or out of alignment with each other, as desired.

The valve of the present invention comprises a top mounting pad that permits direct mount of a manual or automated actuator. Said top pad is marked to indicate fluid flow path. Further, a groove in said top pad protects an actuator from fluid pressure should fluid migrate past stem seals. An alternative stem seal using packing can be used for added durability and functionality, particularly in high abrasive/high heat environments.

Pressure containing mechanical fasteners (typically bolts) allow for an air gap to prevent corrosive gas from saturating said fasteners. Interior valve components can be removed and replaced without disconnecting an actuator from said valve. Further, all interior valve components are caged between an interior sleeve and actuator pad so all can be easily inserted or removed in one operation. At least one interior sleeve channels fluid flow into the trim and flow path of the valve and protects the valve's body from harmful effects (such as from fluid erosion or corrosion) and can be quickly and easily replaced should said sleeve(s) begin to wear.

In a preferred embodiment, the valve of the present invention comprises an inline and angled flow path within a valve body; one or the other of said flow paths can be blocked or plugged off with a removeable plug. Further, said removable plug can further comprise a wear disc with at least one sensor port to provide a replaceable component in a high wear location, as well as a port for sensing and providing notice, when said wear disc requires replacement. In an alternative embodiment, the valve of the present invention comprises a single fluid inlet and single fluid outlet, with no blanking plug required.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
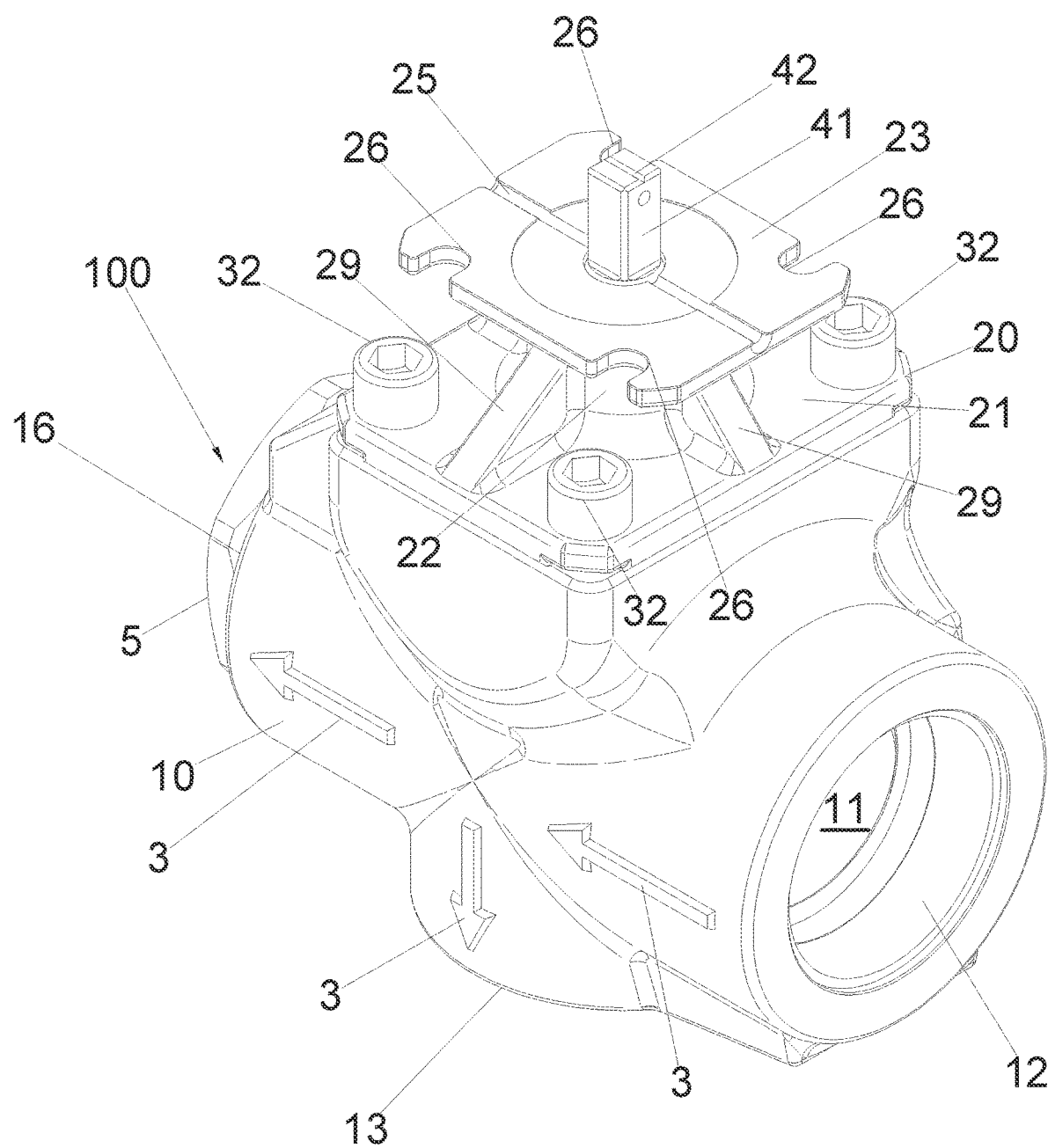
FIG. 1 depicts a first side perspective view of the valve assembly of the present invention.

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

In a preferred embodiment, valve assembly 100 is used to control and/or interrupt the flow rate and flowing pressure of a fluid flowing through a pipeline, flow line or other fluid conduit. Referring to the drawings, FIG. 1 depicts a first side perspective view of valve assembly 100 of the present invention, while FIG. 2 depicts a second side perspective view of said valve assembly 100 of the present invention.

Figure 2:
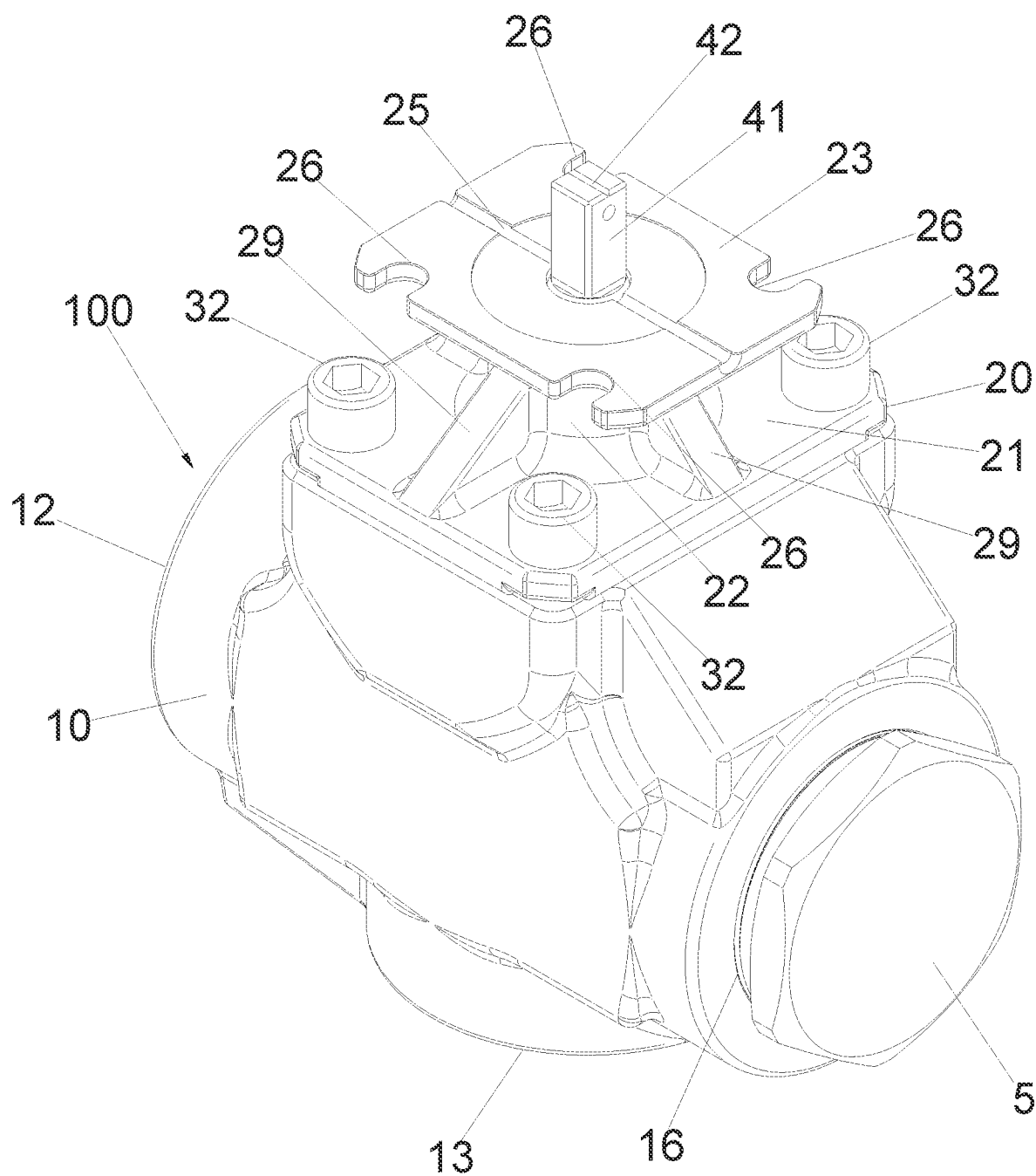
FIG. 2 depicts a second side perspective view of the valve assembly of the present invention.

Referring to FIG. 1, valve assembly 100 generally comprises valve body or housing 10 having inner chamber 11, as well as fluid inlet 12, side fluid outlet 16 and lower fluid outlet 13; fluid inlet 12, side fluid outlet 16 and lower fluid outlet 13 are all in fluid communication with said inner chamber 11. Flow direction arrows 3 can be disposed on the outer surface of body/housing 10 to indicate proper flow direction through valve 100.

Still referring to FIG. 1, valve assembly 100 further comprises valve bonnet 20. Valve bonnet 20 comprises a housing for a valve stem of valve assembly 100 (including valve actuation stem 41 having channel 42) and is operationally attached to the upper surface of valve body 10. More specifically, said bonnet 20 further comprises lower mounting plate 21, neck member 22 and upper mounting pad 23. Bolt recesses 26 are disposed in spaced relationship through upper mounting pad 23. Channel 25 is disposed along the upper surface of said mounting plate 23. Lower mounting plate 21 is operationally attached to valve body 10 with mechanical fasteners; in a preferred embodiment, said mechanical fasteners comprise threaded bolts having bolt heads 32. Optional support ribs 29 can be disposed on bonnet 20 to provide structural support to said bonnet 20.

As depicted in FIG. 1, removeable blanking plug 5 can be selectively installed within side fluid outlet 16; when installed in said side fluid outlet 16, said removable blanking plug 5 prevents or blocks fluid flow out of said side fluid outlet 16. Alternatively, if desired, said removable blanking plug 5 can be selectively installed within lower fluid outlet 13 in order to prevent or block fluid flow out of said lower fluid outlet 13.

FIG. 2 depicts a side perspective view of valve assembly 100, rotated compared to the view depicted in FIG. 1. As depicted in FIG. 2 (and FIG. 1), valve assembly comprises valve body 10 and bonnet 20. Bonnet 20 further comprises lower mounting plate 21, neck member 22 and upper mounting pad 23. Optional support ribs 29 are disposed on bonnet 20. A plurality of bolt recesses 26 extend through upper mounting pad 23 and are arranged in spaced relationship, while channel 25 is disposed along the upper surface of said mounting plate 23. Lower mounting plate 21 of bonnet 20 is operationally attached to valve body 10 using bolts, each having shaped bolt head 32. Valve actuation stem 41 is disposed through bonnet 20 and extends past upper mounting pad 23. It is to be observed that valve actuation stem 41 has a groove 42 and is rotatable relative to said upper mounting pad 23 as more fully described below.

Valve body or housing 10 has fluid inlet 12, side fluid outlet 16 and lower fluid outlet 13. As depicted in FIG. 2, removeable blanking plug 5 is selectively installed within side fluid outlet 16 to prevent or block fluid flow out of said side fluid outlet 16. Alternatively, if desired, said removable blanking plug 5 can be selectively installed within lower fluid outlet 13 in order to prevent or block fluid flow out of said lower fluid outlet 13.

Figure 3:
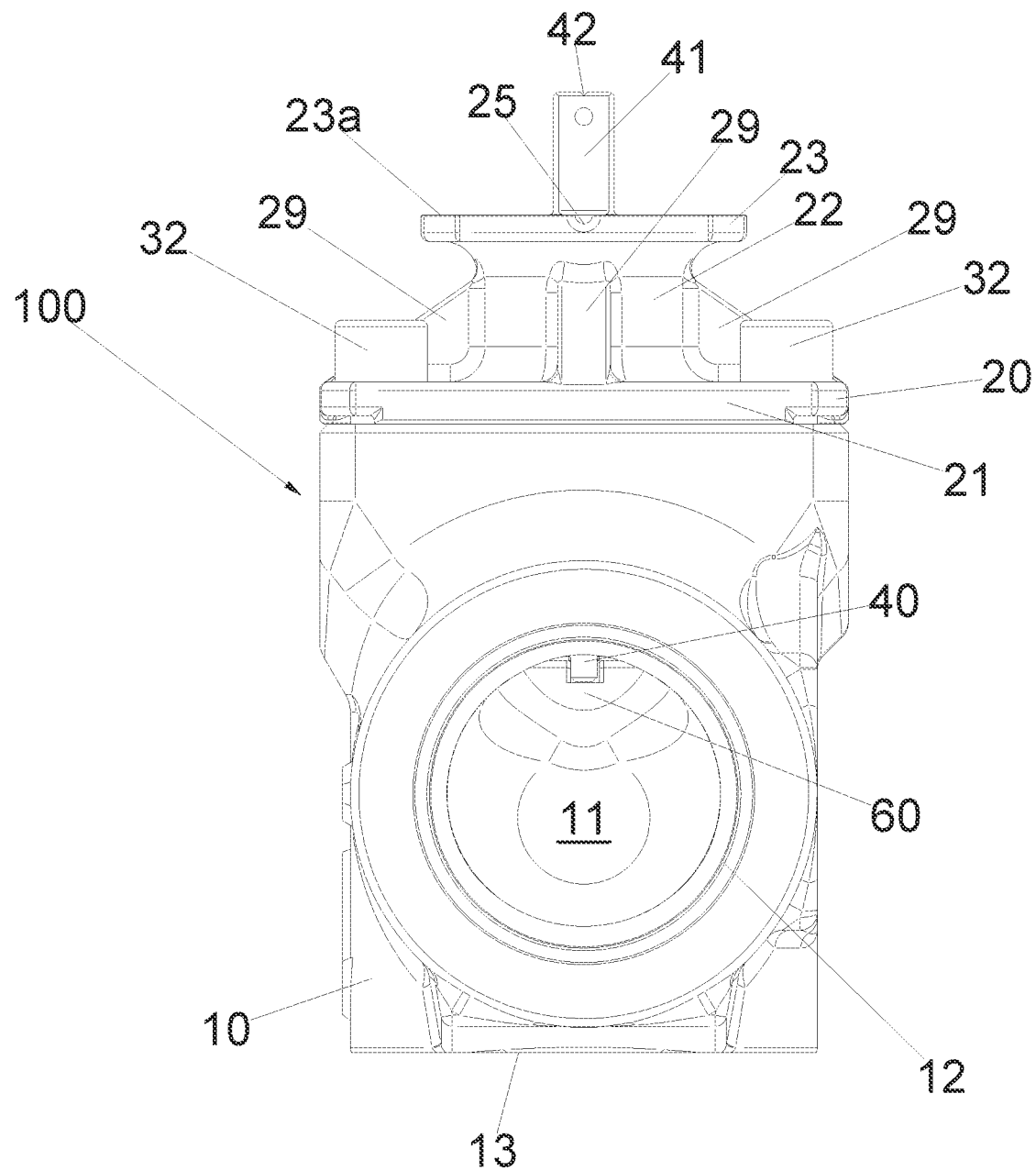
FIG. 3 depicts a first end view of the valve assembly of the present invention.
Figure 4:
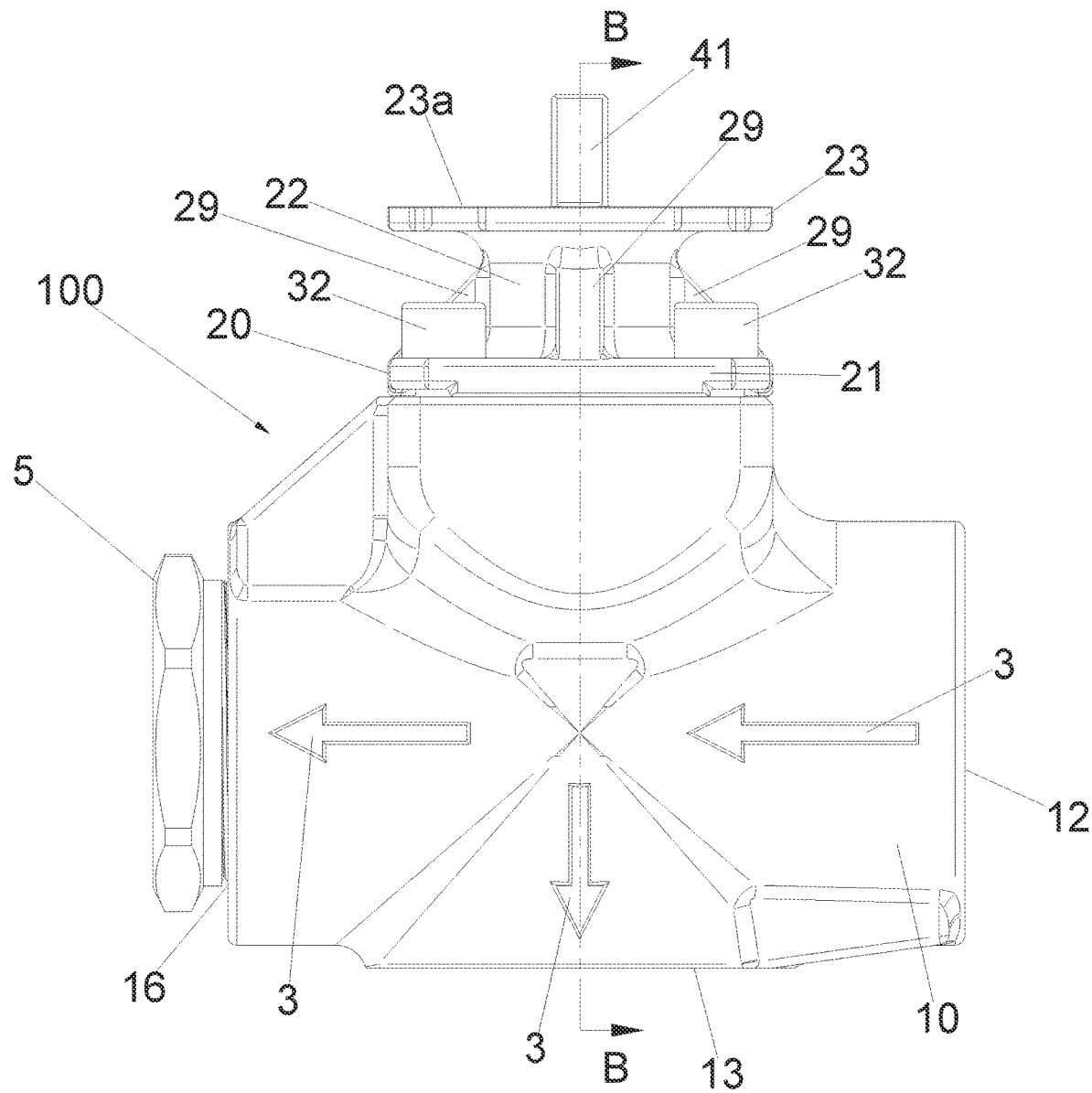
FIG. 4 depicts a side view of the valve assembly of the present invention.

FIG. 3 depicts a first end view of valve assembly 100, while FIG. 4 depicts a side view of said valve assembly 100. Referring to FIG. 3, fluid inlet 12 extends into inner chamber 11 in valve body 10. Components of a valve rotator 40 and rotatable flow trim disk 60 are disposed within said inner chamber 11 in valve body 10 and are visible through fluid inlet 12.

Referring to FIGS. 3, bonnet 20 comprises lower mounting plate 21, neck member 22, upper mounting pad 23, and support ribs 29. Lower mounting plate 21 is attached to body member 10 using removeable threaded bolts having bolt heads 32. Rotatable valve actuation stem 41 (having upper groove 42, visible in FIG. 3) is rotatably disposed through bonnet 20 and extends beyond the upper surface 23a of upper mounting pad 23 of bonnet 20. As depicted in FIG. 3, channel 25 is disposed along the upper surface of said mounting plate 23.

Referring to FIG. 4, valve assembly 100 generally comprises valve body or housing 10 having fluid inlet 12, side fluid outlet 16 and lower fluid outlet 13. Flow direction arrows 3 can be disposed on the outer surface of body/housing 10 to indicate proper flow direction through valve 100. Removeable blanking plug 5 is selectively installed within side fluid outlet 16 to prevent or block fluid flow out of said side fluid outlet 16. If desired, said removable blanking plug 5 can be selectively installed within lower fluid outlet 13 in order to prevent or block fluid flow out of said lower fluid outlet 13. Valve bonnet 20 comprises lower mounting plate 21, neck member 22, upper mounting pad 23 and support ribs 29. Lower mounting plate 21 is operationally attached to valve body 10 with mechanical fasteners having bolt heads 32.

Figure 5:
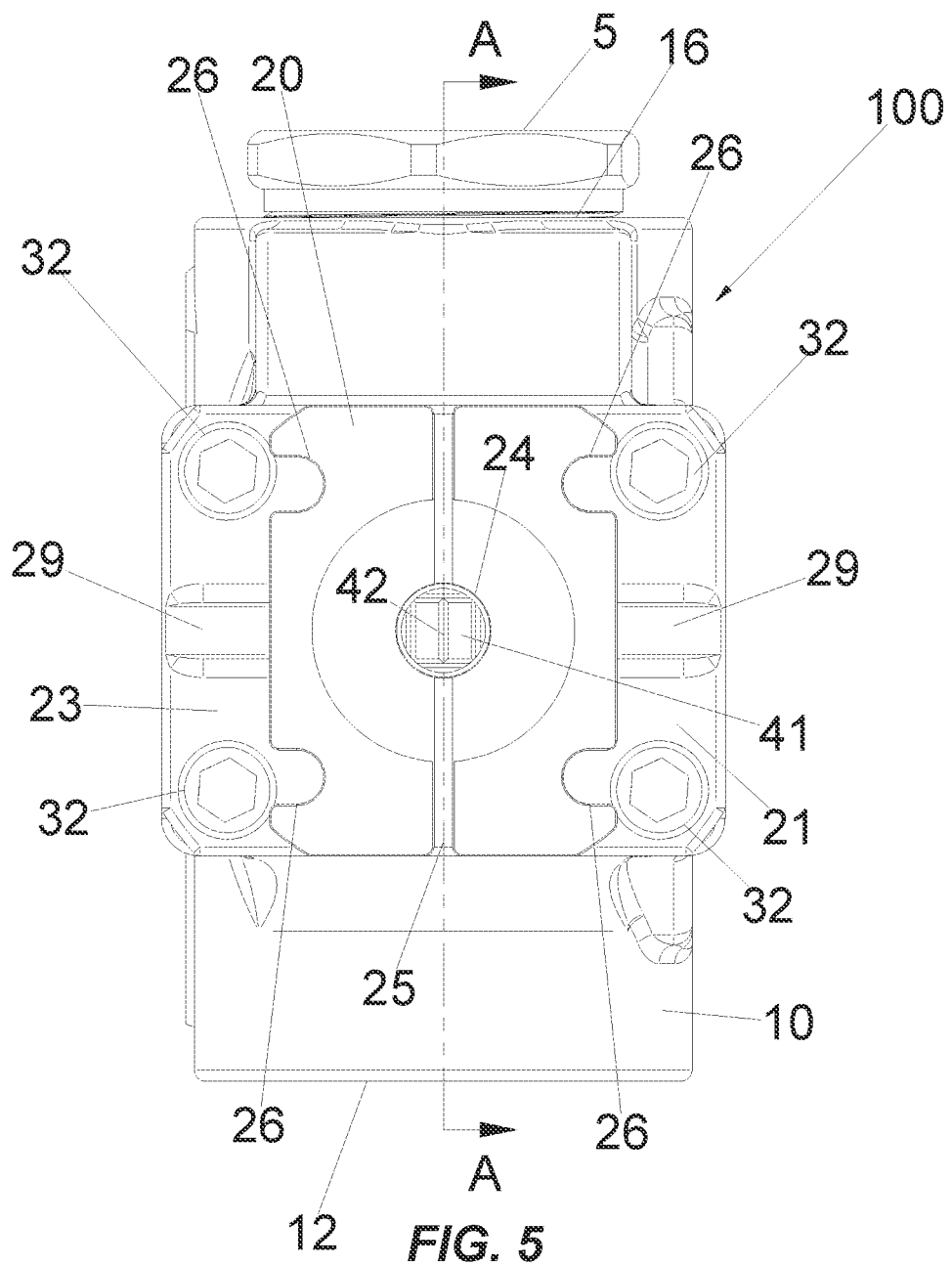
FIG. 5 depicts a top view of the valve assembly of the present invention.

FIG. 5 depicts a top or overhead view of valve assembly 100 of the present invention. Lower mounting plate 21 of bonnet 20 is removably affixed to body member 10 using threaded bolts having shaped bolt heads 32. Bonnet 20 has support ribs 29. Rotatable valve actuation stem 41 is rotatably disposed within through bore 24 extending through bonnet 20. Groove or channel 42 is disposed on the upper surface of valve actuation stem 41, while channel 25 is disposed on the upper surface of upper mounting pad 23 of bonnet 20. It is to be observed that channels 42 and 25 can be oriented in linear alignment depending on the rotational position of said rotatable actuation stem 41.

In a preferred embodiment, a plurality of apertures 26 extend through upper mounting pad 23. Said apertures 26 can be oriented and spaced in a desired pattern and are configured to permit mounting of an automated or powered actuator (not depicted) on said upper mounting pad 23 using threaded bolts or other mechanical fasteners. Removeable blanking plug 5 is installed within side fluid outlet 16 to prevent or block fluid flow out of said side fluid outlet 16.

Figure 6:
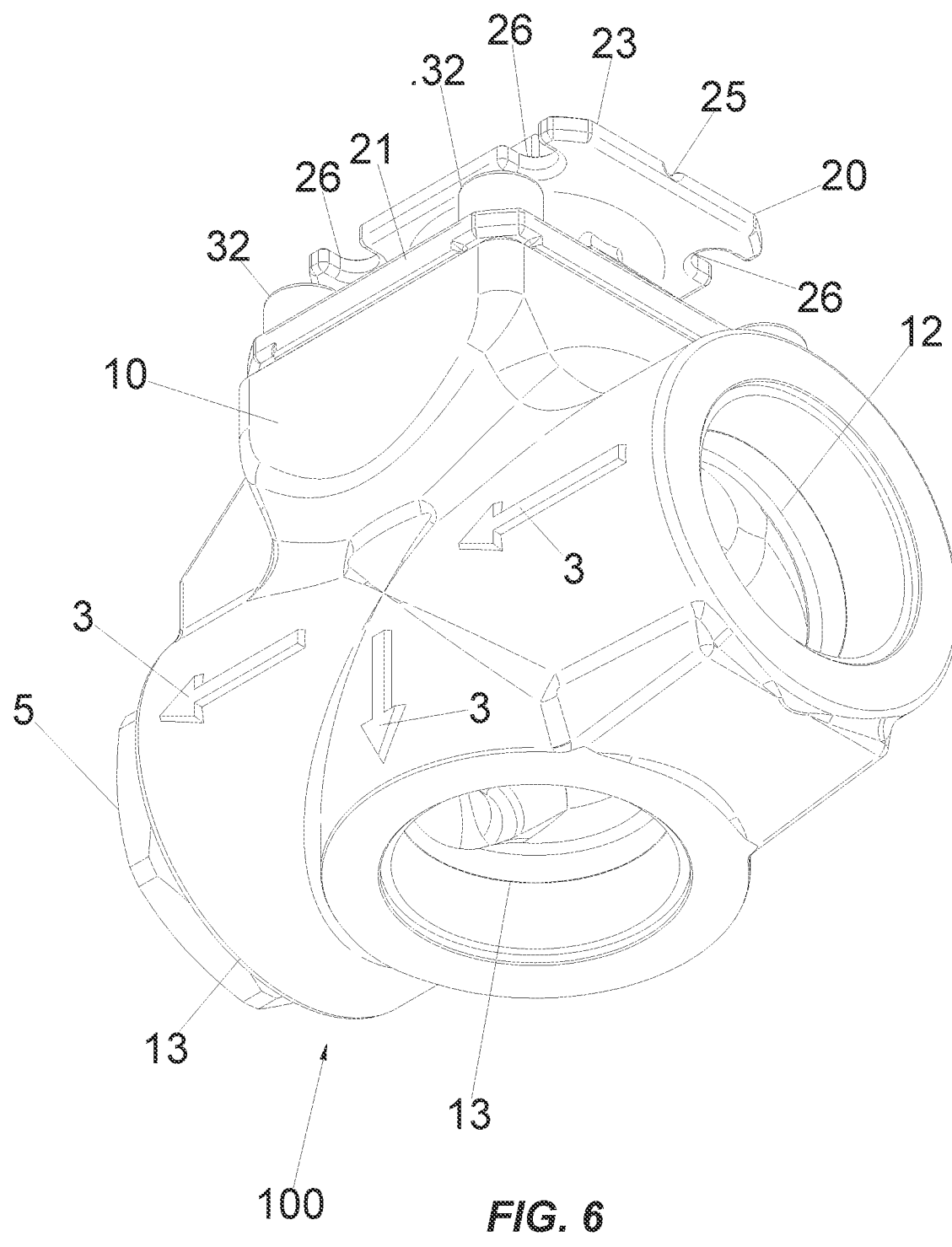
FIG. 6 depicts a bottom perspective view of the valve assembly of the present invention.

FIG. 6 depicts a bottom perspective view of valve assembly 100 of the present invention. Body member 10 generally comprises fluid inlet 12 and lower fluid outlet 13, both extending into body member 10. Flow direction arrows 3 are disposed on said body member 10 and indicate preferred fluid flow direction through valve 100. Bonnet 20 is operationally attached to the upper surface of said body member 10. A plurality of bolt recesses 26 extend through upper mounting pad 23 and are arranged in spaced relationship, while channel 25 is disposed along the upper surface of said mounting plate 23. Lower mounting plate 21 of bonnet 20 is operationally attached to valve body 10 using bolts, each having shaped bolt head 32. Removeable blanking plug 5 is installed within side fluid outlet 16.

Figure 7:
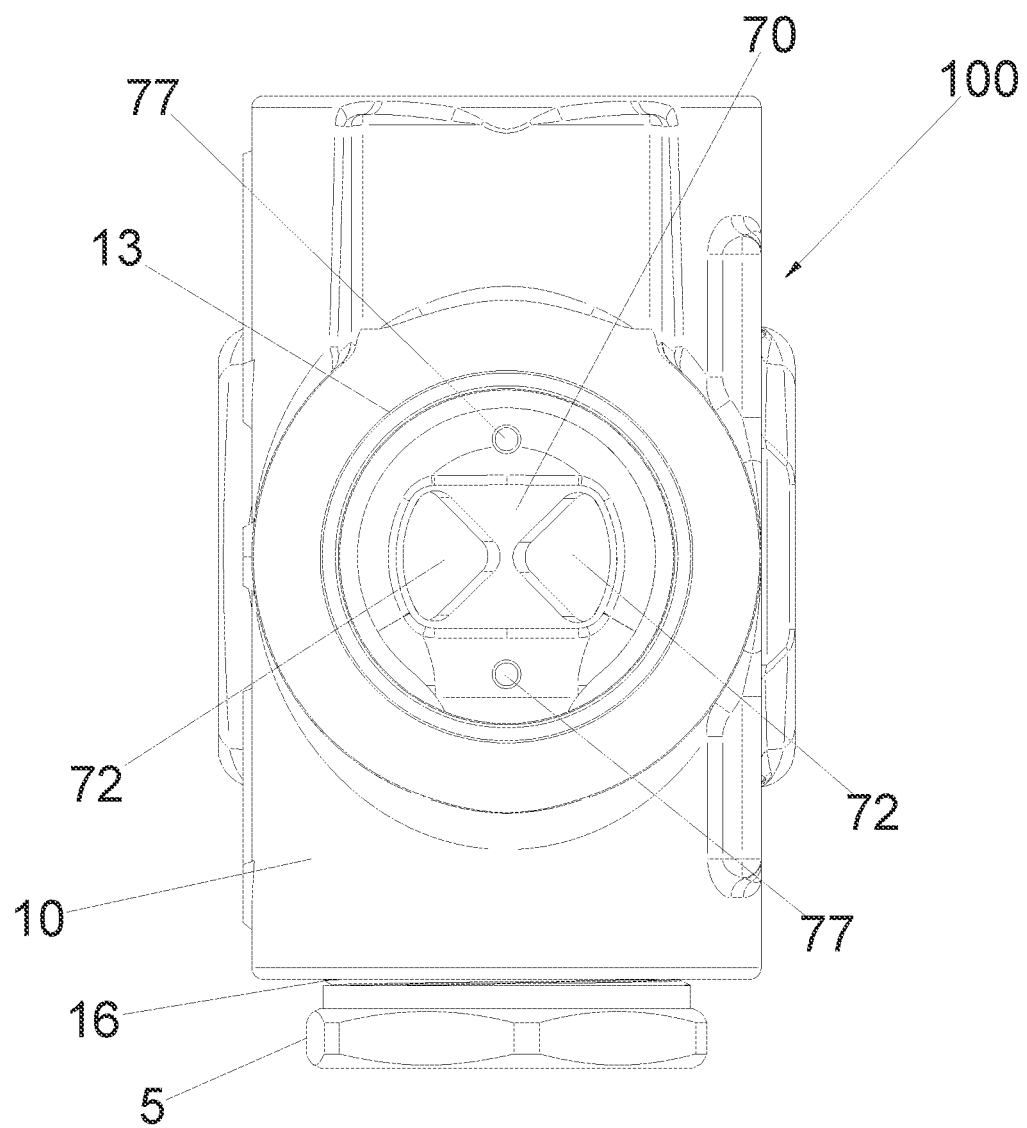
FIG. 7 depicts a bottom view of the valve assembly of the present invention.

FIG. 7 depicts a bottom view of valve assembly 100 of the present invention having body 10. Bottom fluid outlet 13 extends into inner body 10. Fixed flow trim disk 70 having sized apertures 72 is disposed within said body 10 and is visible through fluid outlet 13. Alignment pins 77 secure said fixed flow trim disk 70 in a desired position. Additionally, removeable blanking plug 5 is installed within side fluid outlet 16 of body member 10.

Figure 8:
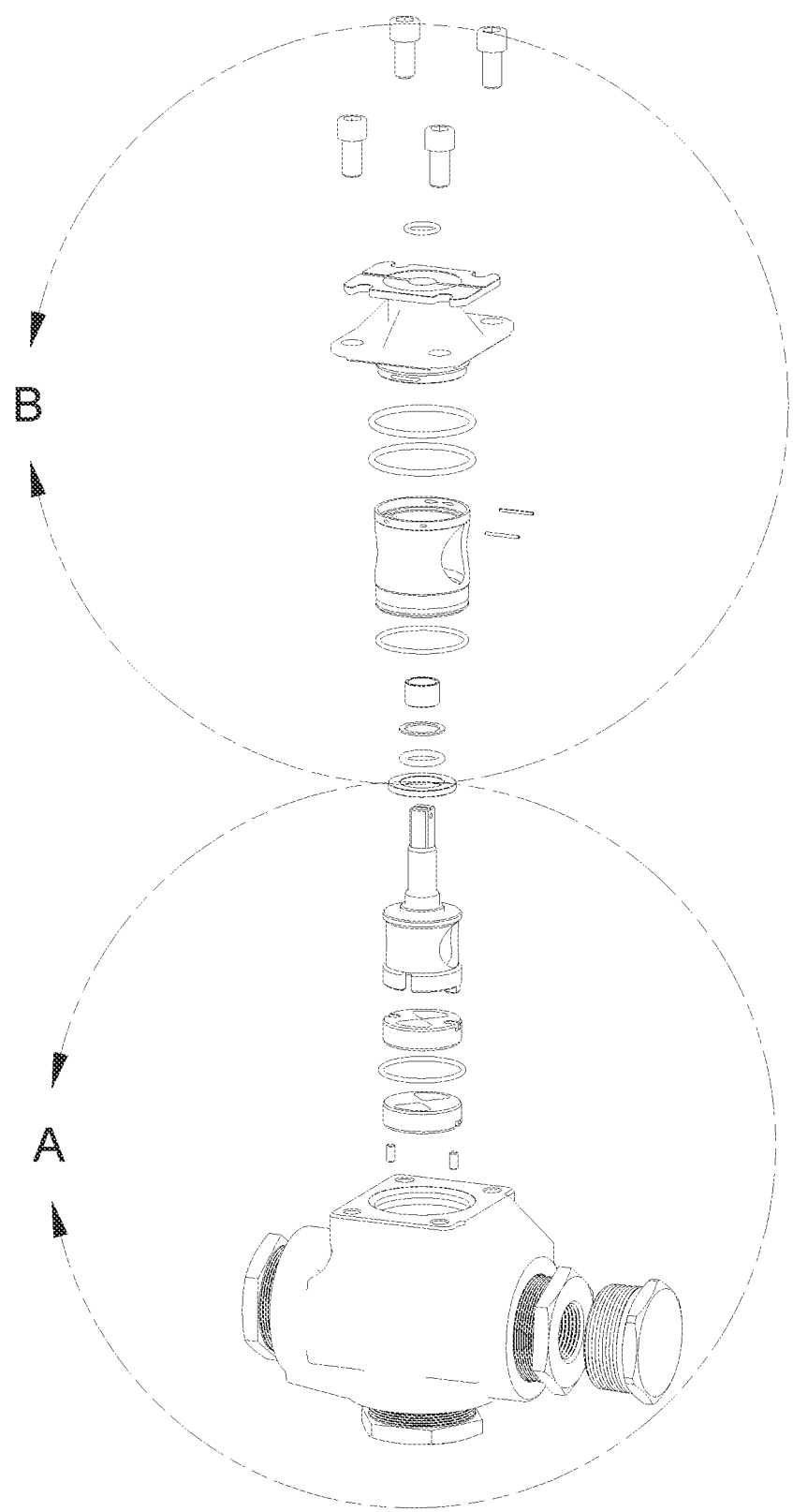
FIG. 8 depicts an exploded perspective view of the valve assembly of the present invention.

FIG. 8 depicts a side perspective and exploded view of valve assembly 100 of the present invention; FIG. 8 is further divided into highlighted areas "A" and "B", each discussed more fully herein.

Figure 9:
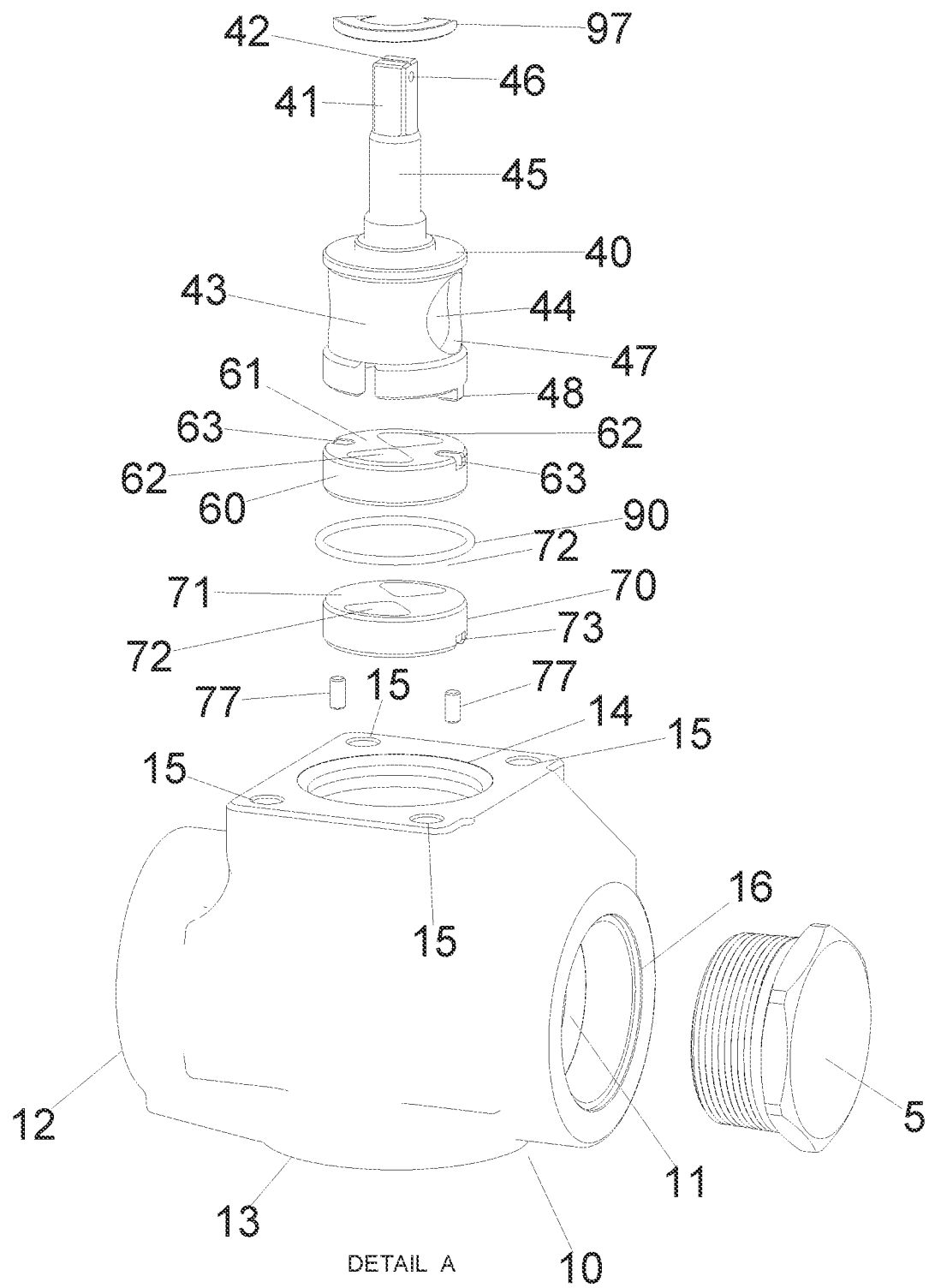
FIG. 9 depicts a perspective view of detail area "A" depicted in FIG. 8.

FIG. 9 depicts a detailed view of the highlighted area "A" shown in FIG. 8. Body 10 defines inner chamber 11 within said body member 10. Fluid inlet 12 and upper aperture 14, as well as side fluid outlet 16 and bottom fluid outlet 13 (not visible in FIG. 9), extend into said inner chamber 11 of body 10. In a preferred embodiment, body 10 further comprises a plurality of threaded bores 15 extending into said body 10 and arranged in spaced relationship. Removable blanking plug 5 can be received within said side fluid outlet 16 and secured in place using a mating threaded connection.

Alignment dowels or pins 77, stationary flow trim disk 70, elastomeric O-ring 90, movable flow trim disk 60 are disposed within inner chamber 11 of body 10. Valve rotator 40 is received within upper aperture 14 and is partially disposed in said inner chamber 11 of body 10. Thrust washer 97 is disposed on said valve rotator 40.

In a preferred embodiment, said valve rotator 40 comprises substantially cylindrical base member 43 defining an inner recess 44. Upwardly protruding elongated stem 45 having stem actuation neck or extension 41 at its upper or distal end extends from said base member 43. In a preferred embodiment, said stem extension neck 41 also has a substantially square cross-sectional profile, upper groove 42 disposed along its upper surface and transverse through-bore 46. A flow aperture 47 having a desired diameter extends through base member 43 into and out of inner recess 44. Valve rotator 40 also has at least one tab 48 protruding from base member 43 for engaging corresponding slots on a rotating orifice disk, as discussed more fully herein.

Stationary flow trim disk 70 generally comprises body section 71 and sized apertures 72 extending through said body section 71. Although said sized apertures 72 are depicted as being substantially wedge-shaped, it is to be understood that said sized apertures 72 can have different dimensions and/or geometries depending upon anticipated fluid flow conditions. By way of example, but not limitation, said sized apertures 72 can be rounded, or can be larger or smaller than the embodiment depicted. A plurality of notches or recesses 73 are disposed along the outer perimeter of said first valve trim 70. Dowels or alignment pins 77 can be partially received in said notches 73 and anchor said flow trim disk 70 against rotational movement.

Movable flow trim disk 60 generally comprises body section 61 and sized apertures 62 extending through said body section 61. Although said sized apertures 62 are depicted as being substantially wedge-shaped, it is to be understood that said sized apertures 62 can have different dimensions and/or geometries depending upon anticipated fluid flow conditions. By way of example, but not limitation, said sized apertures 62 can be rounded, or can be larger or smaller than the embodiment depicted in the drawings. At least one notch or recess 63 is disposed along said stationary flow trim disk 60 for receiving at least one tab 48 of rotator 40.

Figure 10:
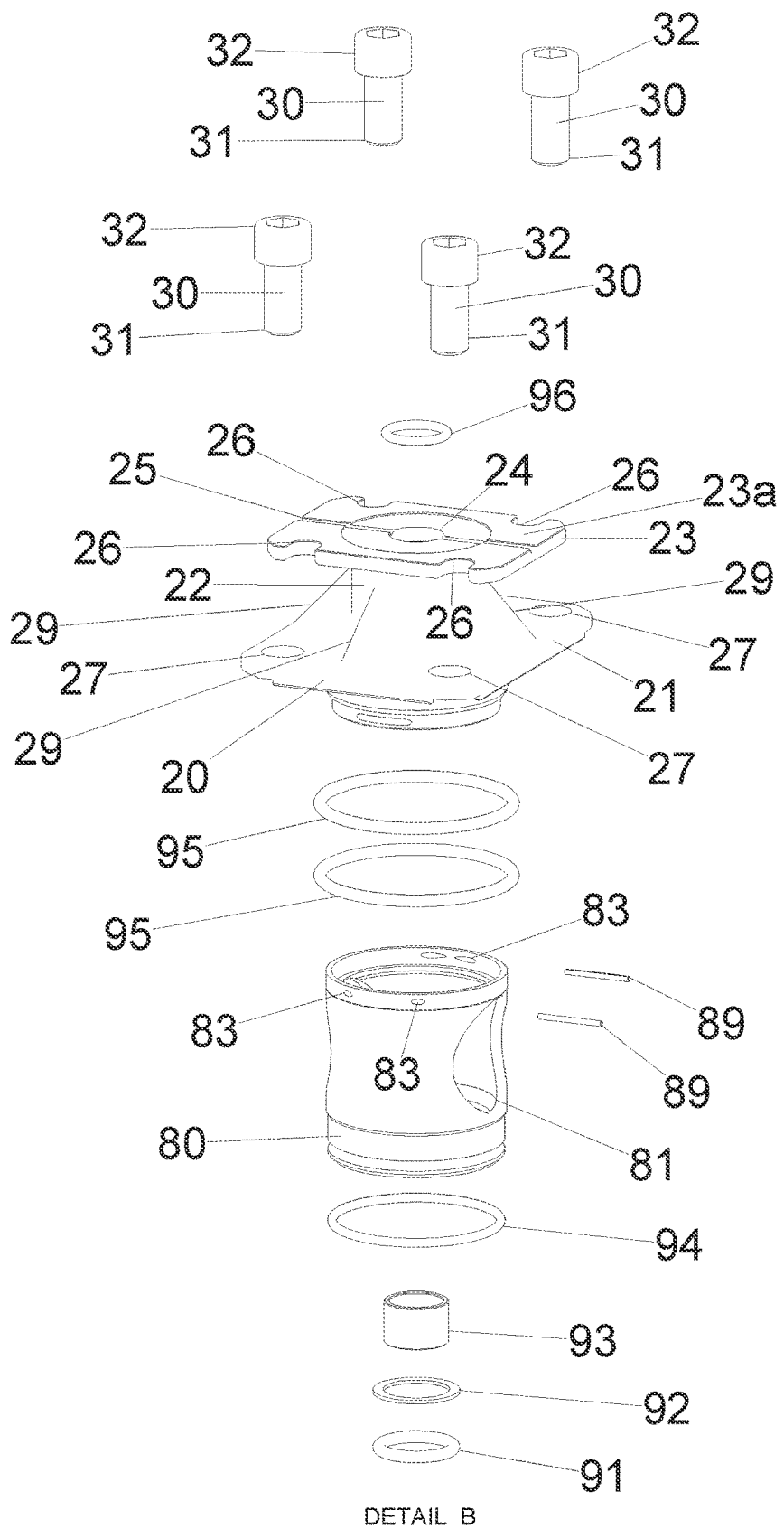
FIG. 10 depicts a perspective view of detail area "B" depicted in FIG. 8.

FIG. 10 depicts a detailed view of the highlighted area "B" shown in FIG. 8. Depicted in FIG. 10 are elastomer O-ring 91, back up ring 92, stem bushing 93, elastomeric O-ring 94, elastomeric O-rings 95, and substantially cylindrical bonnet sleeve 80. Bonnet sleeve 80 has transverse bonnet sleeve flow bore 81. Bonnet sleeve pins 89 are configured to be received within aligned apertures 83 in said bonnet sleeve 80.

Bonnet 20 comprises lower mounting plate 21, neck member 22 and upper mounting pad 23. A plurality of bolt recesses 26 extend through upper mounting pad 23 and are arranged in spaced relationship, while channel 25 is disposed along the upper surface 23a of said mounting plate 23.

Through bore 24 extends through bonnet 20, including neck member 22 thereof. Lower mounting plate 21 of bonnet 20 is operationally attached to valve body 10 using mechanical fasteners; in the embodiment depicted in FIG. 10, said mechanical fasteners comprise threaded bolts 30, each having a threaded section 31 and bolt head 32. Lower mounting plate 21 has a plurality of spaced apertures 27 configured for receiving bolts 30. Rotator stem elastomeric O-ring 96 is disposed within bonnet 20, while elastomeric O-rings 95 are disposed within the valve assembly of the present invention.

Figure 11:
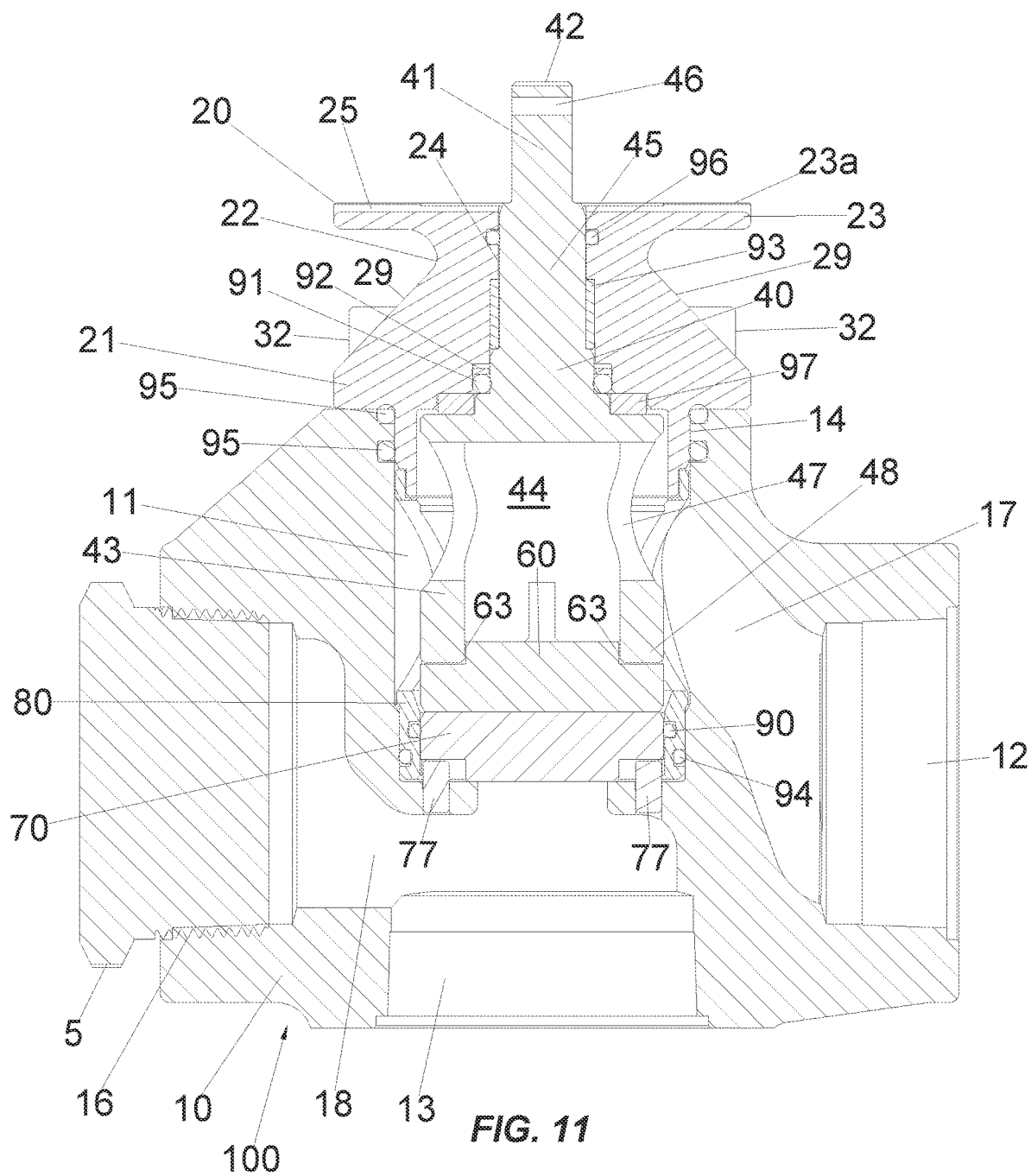
FIG. 11 depicts a side sectional view of the valve assembly of the present invention along line A-A of FIG. 5.

FIG. 11 depicts a side sectional view of valve assembly 100 of the present invention along line A-A of FIG. 5. Body 10 defines inner chamber 11. Fluid inlet 12, side fluid outlet 16 and bottom fluid outlet 13 extend through said body 10 and into said inner chamber 11 of body 10. Angled flow bore 17 extends from fluid inlet 12 into said inner chamber 11, while inline flow bore 18 extends from said inner chamber 11 to side fluid outlet 16. As depicted in FIG. 11, bottom fluid outlet 13 is also in fluid communication with inner chamber 11 of body member 10. Removable blanking plug 5 is received within said side fluid outlet 16 and is secured in place using a mating threaded connection.

Stationary flow trim disk 70 is disposed within said inner chamber 11 and is secured against rotational movement by alignment pins 77 which, in turn, are received within bores in body member 10 and are secured against movement relative to body member 10. Bonnet sleeve 80 is also disposed within said inner chamber 11; elastomeric O-ring 90 forms a fluid pressure seal between bonnet sleeve 80 and stationary flow trim disk 70. Similarly, elastomeric O-ring 94 forms a fluid pressure seal between bonnet sleeve 80 and body 10.

Valve rotator 40 is partially disposed in said inner chamber 11 of body 10 and extends through upper aperture 14 of said body 10. Cylindrical base member 43 of valve rotator 40 has at least one tab 48 protruding from base member 43. Said at least one tab 48 engages with aligned recesses/notches 63 in movable flow trim disk 60.

Bonnet 20 is partially received within upper aperture 14 of body 10. Lower plate 21 of bonnet 20 is secured to said body 10 using threaded bolts having bolt heads 32. Elastomeric O-rings 95 form a fluid pressure seal between said bonnet 20 and body 10. Thrust washer 97, elastomer O-ring 91, back up ring 92, stem bushing 93 and rotator stem elastomeric O-ring 96 are installed within valve assembly 100 as depicted in FIG. 11.

Upwardly extending elongated stem 45 of valve rotator 40 is rotatably received within central through bore 24 extending through neck member 22 of bonnet 20. Stem actuation neck or extension 41 extends beyond the upper surface 23a of upper mounting pad 23 and has a substantially square cross-sectional profile, upper groove 42 and transverse through-bore 46. Channel 25 is disposed on the said upper surface 23a of upper mounting pad 23. At least one flow aperture 47 having a desired diameter extends through base member 43.

Figure 12:
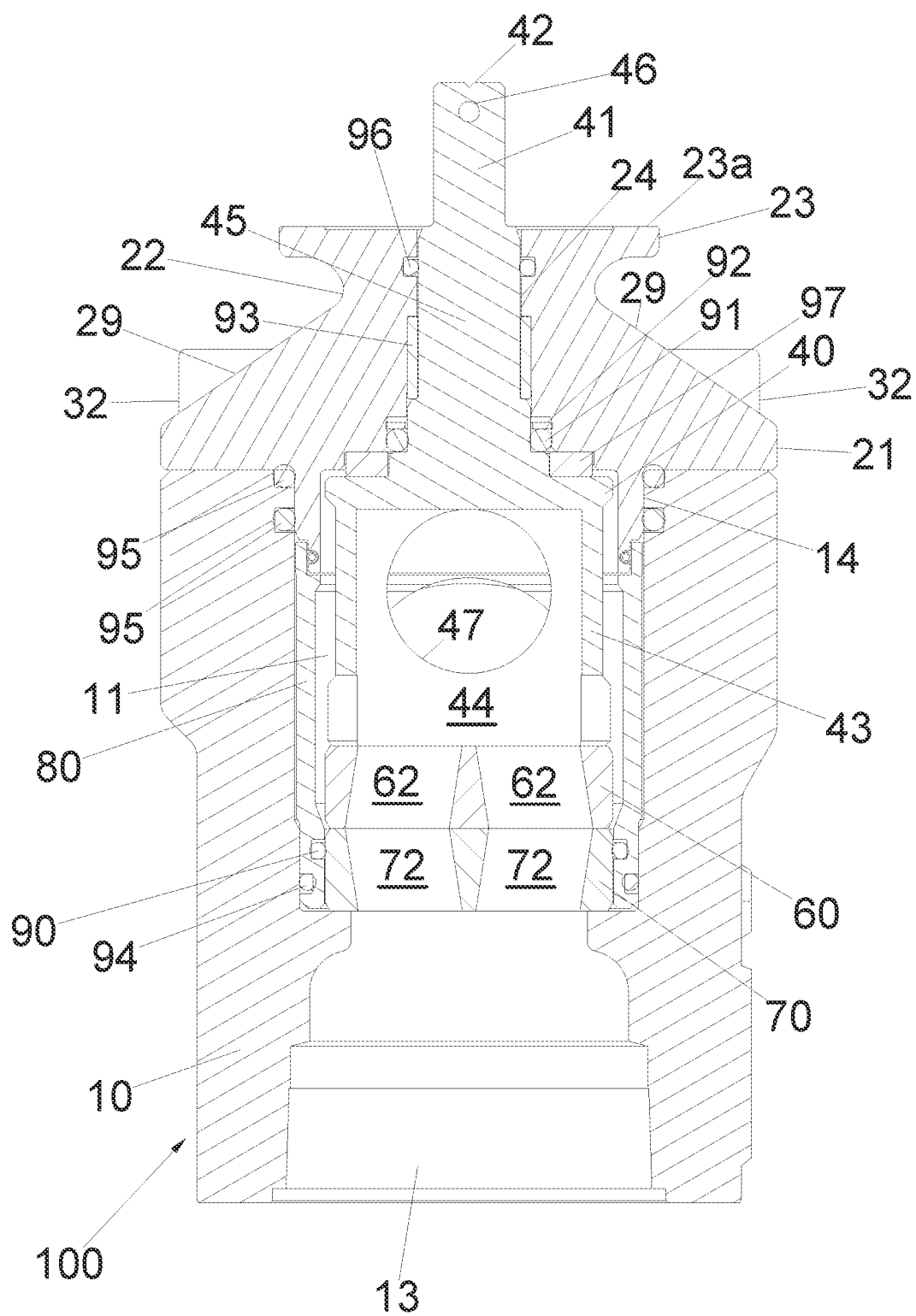
FIG. 12 depicts a side sectional view of the valve assembly of the present invention along line B-B of FIG. 4.

FIG. 12 depicts a side sectional view of valve assembly 100 of the present invention along line B-B of FIG. 4. It is to be observed that the elements depicted in FIG. 12 are assigned the same reference number(s) as the elements depicted in FIG. 11, although some of those elements may not be expressly addressed again in connection with FIG. 12.

Inner chamber 11 is defined within body 10, while bottom fluid outlet 13 extends through said body 10 and into inner chamber 11 of body 10. Stationary flow trim disk 70 is disposed within said inner chamber 11 and is secured against rotational movement Bonnet sleeve 80 is also disposed within said inner chamber 11; elastomeric O-ring 90 forms a fluid pressure seal between bonnet sleeve 80 and stationary flow trim disk 70. Elastomeric O-ring 94 forms a fluid pressure seal between bonnet sleeve 80 and body 10.

As previously discussed in connection with FIG. 11, valve rotator 40 is partially disposed in said inner chamber 11 of body 10 and extends through upper aperture 14 of said body 10. Bonnet 20 is partially received within upper aperture 14 of body 10. Lower plate 21 of bonnet 20 is secured to said body 10 using threaded bolts having bolt heads 32. Elastomeric O-rings 95 form a fluid pressure seal between said bonnet 20 and body 10. Thrust washer 97, elastomer O-ring 91, back up ring 92, stem bushing 93 and rotator stem elastomeric O-ring 96 are installed within valve assembly 100 as depicted in FIG. 12.

Upwardly extending elongated stem 45 of valve rotator 40 is rotatably received within central through bore 24 extending through neck member 22 of bonnet 20. Stem actuation neck or extension 41 extends beyond the upper surface 23a of upper mounting pad 23 and has a substantially square cross-sectional profile, upper groove 42 and transverse through-bore 46. Although not visible in the view depicted in FIG. 12, it is to be understood that channel 25 is disposed on upper surface 23a of upper mounting pad 23. At least one flow aperture 47 having a desired diameter extends through base member 43 of valve rotator 40 into inner recess 44 thereof.

Movable flow trim disk 60 is operationally attached to rotator 40. Rotation of rotator 40 results in corresponding rotation of movable flow trim disk 60 (and sized aperture(s) 62 extending therethrough) relative to stationary flow trim disk 70 (and sized aperture(s) 72 extending therethrough).

As with conventional valves, valve assembly 100 of the present invention can be installed at one or more desired locations along the length of a pipeline, flow line or other conduit containing gas, liquid and/or other fluid. Valve assembly 100 can selectively control and/or interrupt the flowing pressure and flow rate of such gas, liquid and/or other fluid.

In operation, valve assembly 100 of the present invention comprises a valve that reduces the erosion, corrosion, and other operational problems commonly encountered with conventional valves. A desired torque force can be applied to rotator stem 45 (typically using a manual lever handle or automated actuator) in order to rotate said stem 45. Movable flow trim disk 60 is operationally attached to rotator 40; thus, rotation of rotator 40 in turn results in corresponding rotation of movable flow trim disk 60 relative to stationary flow trim disk 70.

Unlike movable flow trim disk 60, stationary flow trim disk 70 is anchored against rotational movement and is not capable of rotation. Referring to FIG. 12, it is to be observed that the amount of flow restriction and/or flowing fluid pressure drop through valve 100 can be controlled by selective rotation of movable flow trim disk 60, which changes or adjusts the alignment of sized aperture(s) 62 in said movable flow trim disk 60 relative to the sized aperture(s) 72 in stationary flow trim disk 70. Maximum flow rate and minimum flowing fluid pressure drop results when sized aperture(s) 62 in said movable flow trim disk 60 and sized aperture(s) 72 in stationary flow trim disk 70 are fully aligned with each other. Conversely, fluid flow rate is restricted, and fluid pressure differential is increased, as sized aperture(s) 62 in said movable flow trim disk 60 and sized aperture(s) 72 in stationary flow trim disk 70 become less aligned—that is, when the common or overlapping area of aligned sized aperture(s) 62 and 72 of said disks are reduced. Fluid flow rate is completely blocked when the sized aperture(s) 62 in said movable flow trim disk 60 and sized aperture(s) 72 in stationary flow trim disk 70 are out of alignment (i.e., fully offset relative to each other) to prevent flow of any fluid through valve assembly 100.

Referring to FIG. 11, pressurized fluid can enter valve assembly 100 through fluid inlet 12. Said fluid can then flow through angled flow bore 17 into inner chamber 11 of body 10 and, further, through flow aperture 47 of rotator 40 and into inner recess 44 of said rotator 40. Referring to FIG. 12, said pressurized fluid can then flow through sized aperture(s) 62 of movable flow trim disk 60 and sized aperture(s) 72 of stationary flow trim disk 70 when said sized aperture(s) of said flow trim disks are at least partially aligned.

In the configuration depicted in FIG. 11, such fluid can then flow through bottom fluid outlet 13; installation of blanking plug 5 in said side fluid outlet 16 blocks fluid from flowing through inline flow bore 18 and out of side fluid outlet 16. It is to be observed that blanking plug 5 can also be selectively installed in said bottom fluid outlet 13 (and removed from side fluid outlet 16), thereby redirecting the fluid to flow through inline flow bore 18 and out of side fluid outlet 16.

Actuation of valve assembly 100 can be accomplished through application of torque forces to, and rotation of, valve actuation stem 41 via manual handle or automated powered valve actuator. Said automated valve actuators can be hydraulically, pneumatically or electrically powered, and are well known to those having skill in the art. The amount of fluid flow restriction and/or fluid pressure reduction through valve assembly 100 can be controlled by selective rotation of movable flow trim disk 60 which is accomplished by selective rotation of rotator 40.

Figure 13:
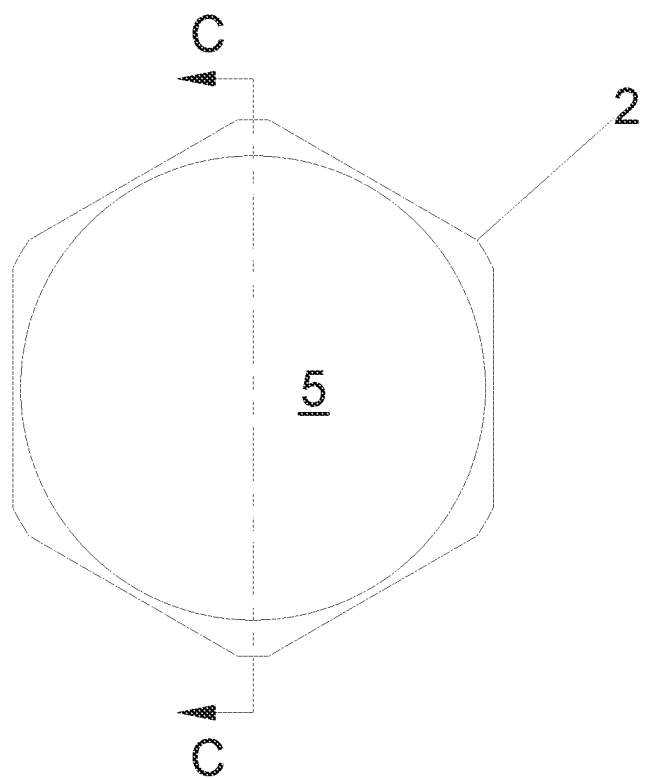
FIG. 13 depicts an end view of a blanking plug of the present invention.
Figure 13A:
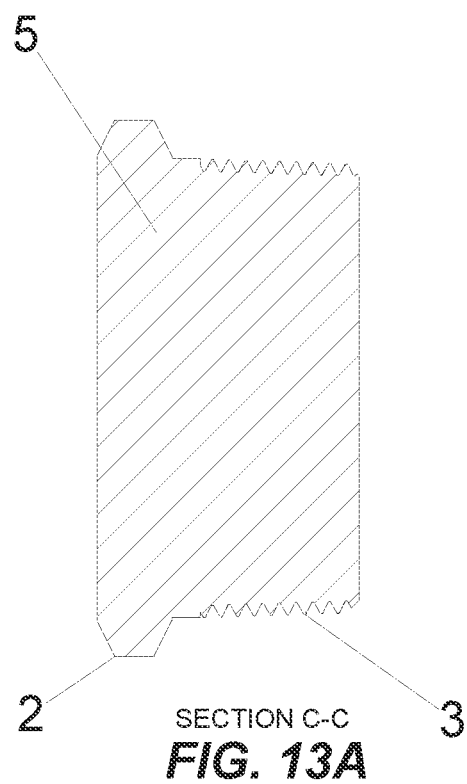
FIG. 13A depicts a side sectional view of the blanking plug of the present invention along line C-C of FIG. 13.

FIG. 13 depicts an end view of blanking plug 5 of the present invention, while FIG. 13A depicts a side sectional view of said blanking plug 5 along line C-C of FIG. 13. Referring to FIG. 13, blanking plug 5 can comprise a head 2 having a desired geometric profile (such as a hexagonal or other multi-sided shape) to accommodate mating engagement with a wrench or other tool. Referring to FIG. 13A, said blanking plug 5 can also comprise threads 3 which can engage with mating threads disposed on the inner surface of side fluid outlet 16 of body 10 (as depicted in FIG. 9, for example).

Figure 14:
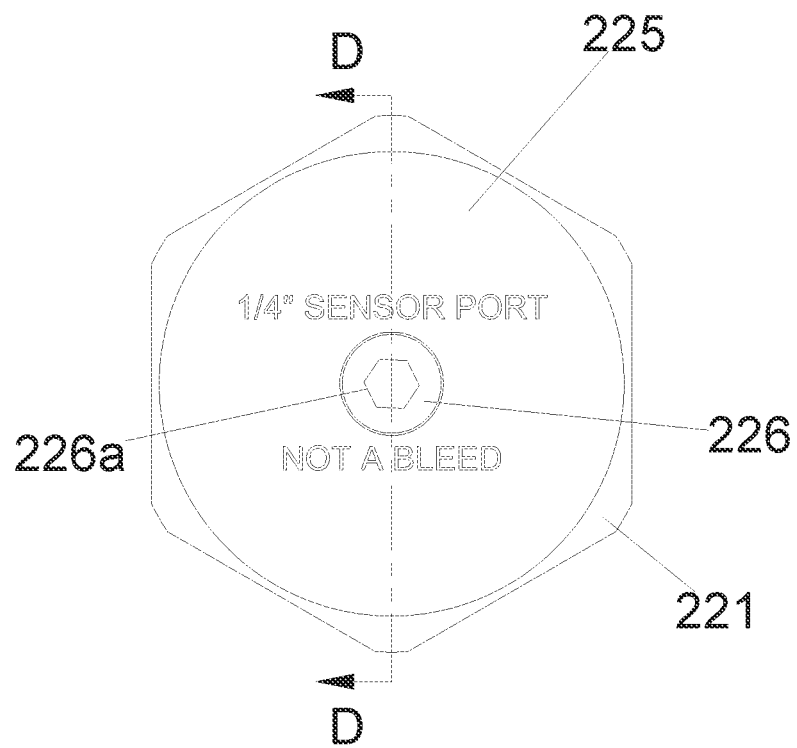
FIG. 14 depicts an end view of a first alternative blanking plug of the present invention.
Figure 14A:
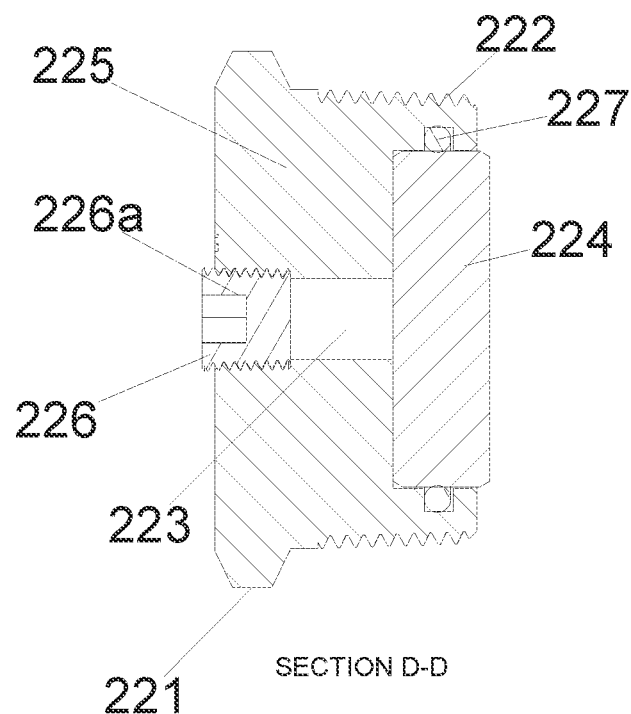
FIG. 14A depicts a side sectional view of the first alternative blanking plug of the present invention along line D-D of FIG. 14.

FIG. 14 depicts an end view of a first alternative blanking plug 225 of the present invention, while FIG. 14A depicts a side sectional view of said first alternative blanking plug 225 along line D-D of FIG. 14. It is to be observed that first alternative blanking plug 225 can be used in place of blanking plug 5, such as depicted in FIG. 11, for example. In addition to head 221 and threads 222, first alternative blanking plug 225 further comprises central through bore 223 extending through said first alternative blanking plug 225. Referring to FIG. 14A, removable sensor plug 226 having shaped profile 226a (for receiving an Allen wrench or other tool) is threadedly received within said through bore 223. Additionally, wear disk 224 is received within a recess formed in alternative blanking plug 225; elastomeric O-ring 227 creates a fluid pressure seal between said wear disk 224 and first alternative blanking plug 225.

In operation, in the event that high fluid pressure, high fluid temperature, suspended solids, flow turbulence or other harmful conditions exist within alternative valve assembly 100, wear disk 224 can suffer erosive or abrasive damage. Such damage can eventually wear through said wear disk 224 and/or otherwise damage the integrity of said fluid pressure seal formed between said wear disk 224 and first alternative blanking plug 225. In such event, fluid pressure from within valve assembly 200 will be communicated to through bore 223. The existence of such fluid pressure within through bore 223 can be observed upon removal of sensor plug 226 from bore 223, thereby providing a positive indication of damage caused (or potentially caused) by fluid conditions within said valve assembly 100, as well as the possible need for remedial action. Additionally, a pressure sensor or pressure gauge can be disposed in fluid communication with through bore 223 to measure any pressure increase within said bore 223. By way of illustration, but not limitation, a pressure sensor or pressure gauge can be installed in bore 223 in place of sensor plug 226.

Figure 15:
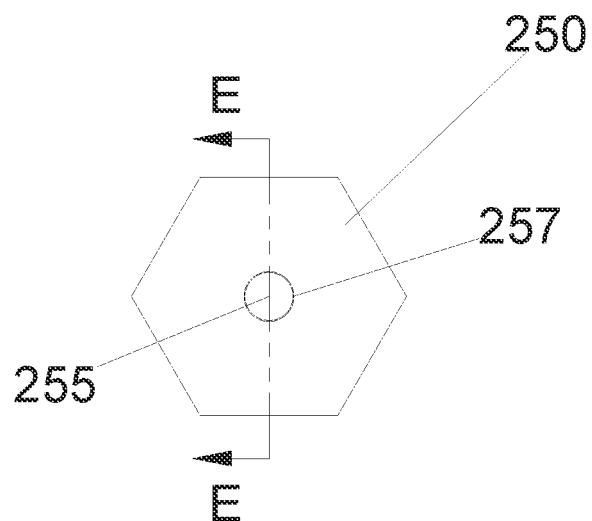
FIG. 15 depicts an end view of an alternative signaling sensor port plug assembly of the present invention.
Figure 15A:
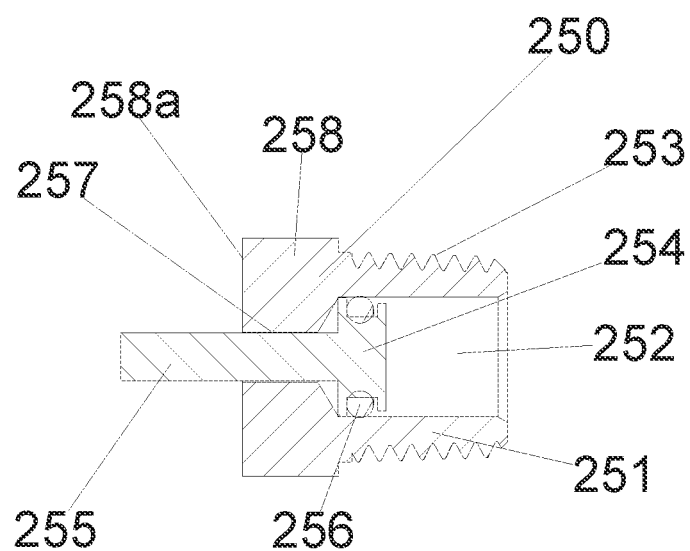
FIG. 15A depicts a side sectional view of the alternative signaling sensor port plug assembly of the present invention along line E-E of FIG. 15.

FIG. 15 depicts an end view of an alternative signaling sensor port plug assembly 250 of the present invention, while FIG. 15A depicts a side sectional view of said alternative signaling sensor port plug assembly 250 along line E-E of FIG. 15. It is to be observed that alternative signaling sensor port plug 250 can be used in place of removable sensor plug 226, such as depicted in FIG. 14A, for example. If desired, said alternative port plug assembly 250 can replace or be used in place of sensor plug 225 depicted in FIGS. 14 and 14A.

In a preferred embodiment, said sensor port plug assembly 250 generally comprises plug body 251 and head 258. Central through bore 252 extends through said plug body 251, while aperture 257 extends through head 258. External threads 253 are disposed on the outer surface of said plug body 251. Piston 254 is moveably disposed within bore 252, and piston 254 further has stem section 255 attached to said piston 254. Elastomeric O-ring 256 provides a fluid pressure seal between piston 254 and the inner surface of said bore 252.

Referring back to FIG. 14A, in the event that high fluid pressure, high fluid temperature, suspended solids, flow turbulence or other harmful conditions exist within alternative valve assembly 100, wear disk 224 can suffer erosive or abrasive damage that can eventually wear through said wear disk 224 and/or otherwise damage the integrity of said fluid pressure seal formed between said wear disk 224 and alternative blanking plug 225. In such event, wear disk 224 and O-ring 227 will not provide a fluid pressure seal, and fluid pressure from within valve assembly 100 will be communicated to through bore 223. Referring to FIG. 15A, such fluid pressure will act upon piston 254, thereby creating a pressure differential across said piston 254 and forcing said piston 254 to move or travel within through bore 252. When this occurs, stem 255 slides within aperture 257 and extends beyond outer surface 258a of plug head 258, thereby providing a visual indication or warning, easily visible from outside a valve assembly, of damage caused (or potentially caused) by fluid conditions within said valve assembly 100, as well as the possible need for remedial action.

Figure 16:
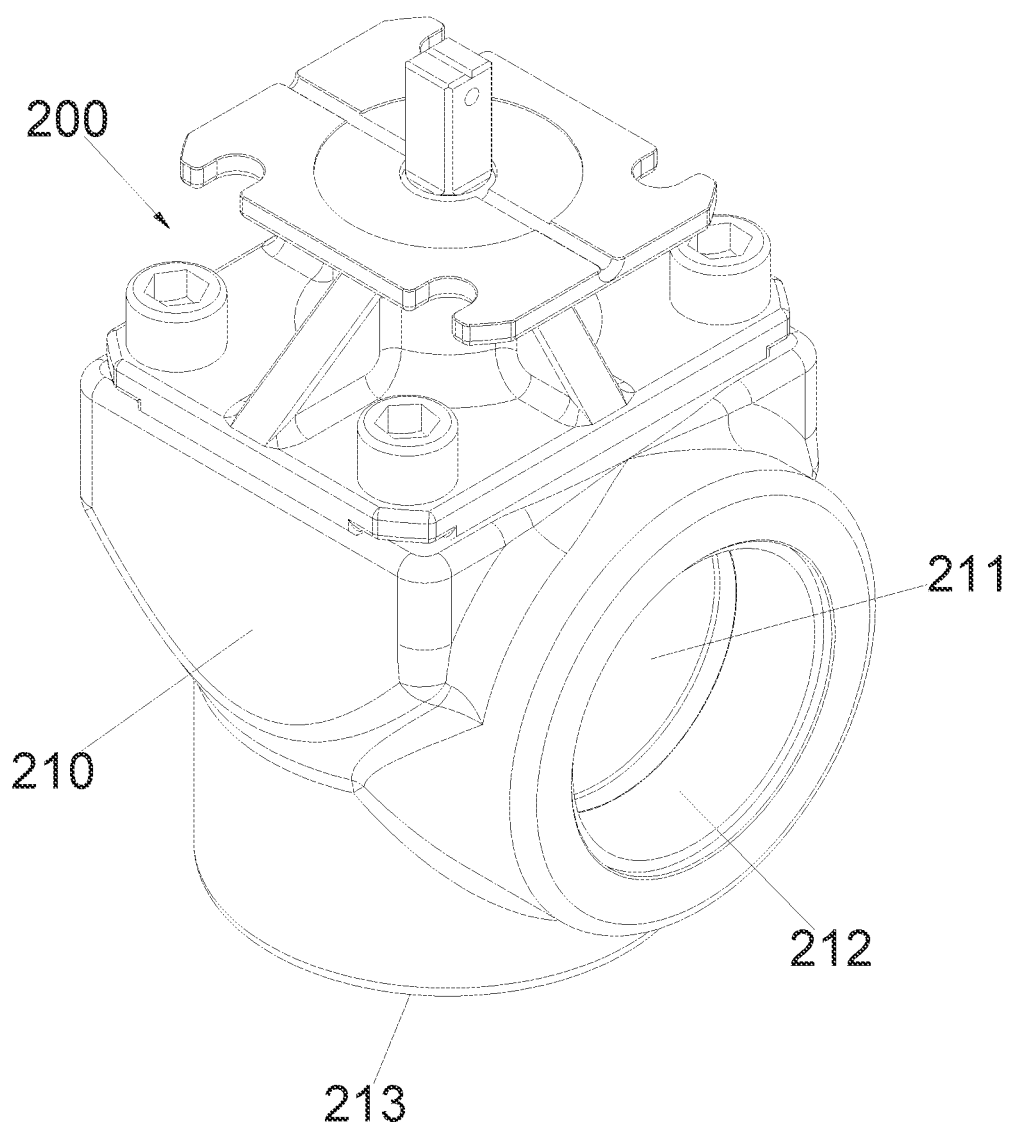
FIG. 16 depicts a side perspective view of a first alternative embodiment valve assembly of the present invention.
Figure 17:
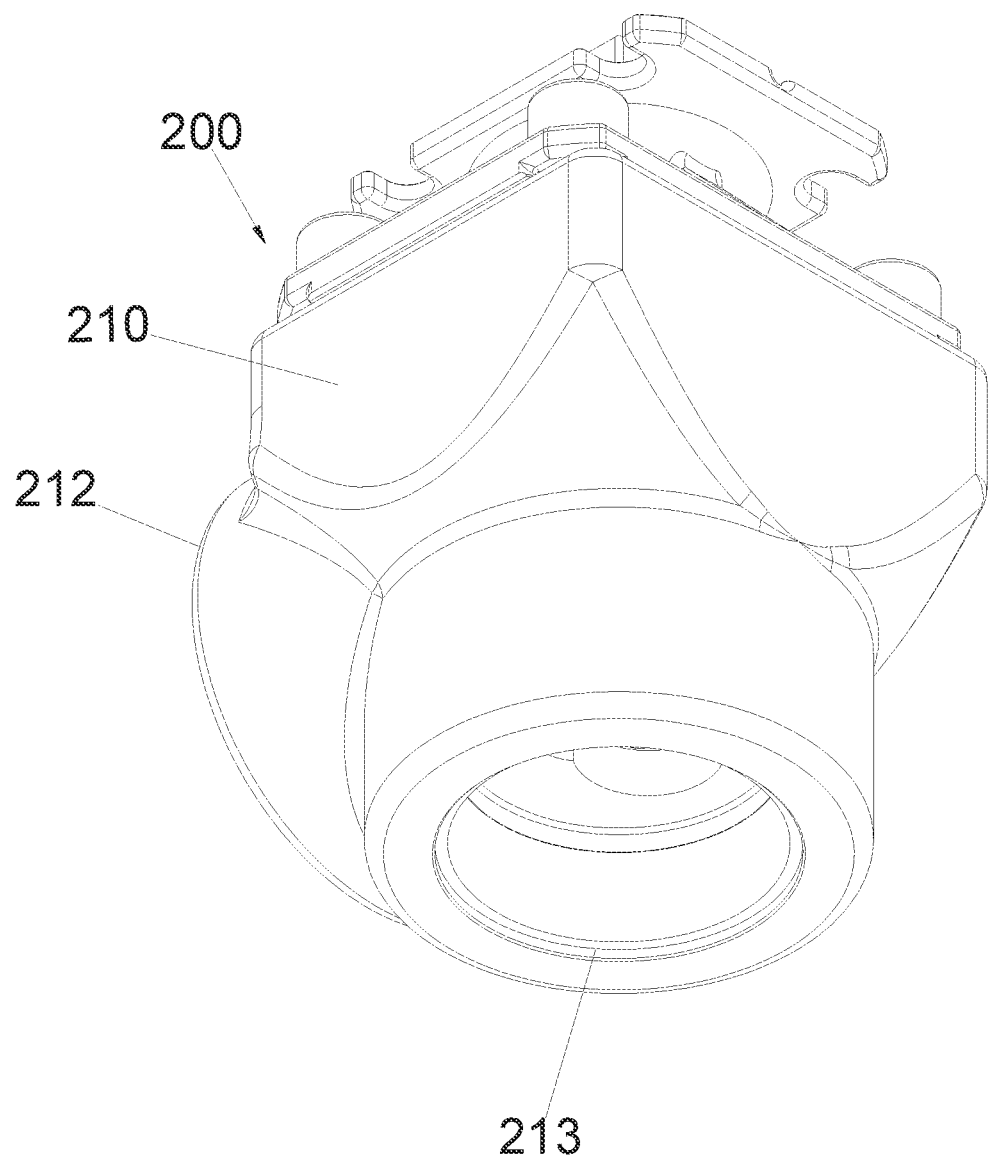
FIG. 17 depicts a bottom perspective view of a first alternative embodiment valve assembly of the present invention.

FIG. 16 depicts a first side perspective view of a first alternative embodiment valve assembly 200 of the present invention. FIG. 17 depicts a bottom perspective view of said first alternative valve assembly 200 of the present invention.

Referring to FIGS. 16 and 17, first alternative embodiment valve assembly 200 has alternative valve body 210. Valve body member 210 generally comprises fluid inlet 212, inner chamber 211 and first fluid outlet 213. First fluid outlet 213 is in fluid communication with inner chamber 211 formed within body 210. Other components depicted in FIGS. 16 and 17 are identical or substantially similar to components depicted in FIGS. 1 through 12 described in connection with valve assembly 100.

Figure 18:
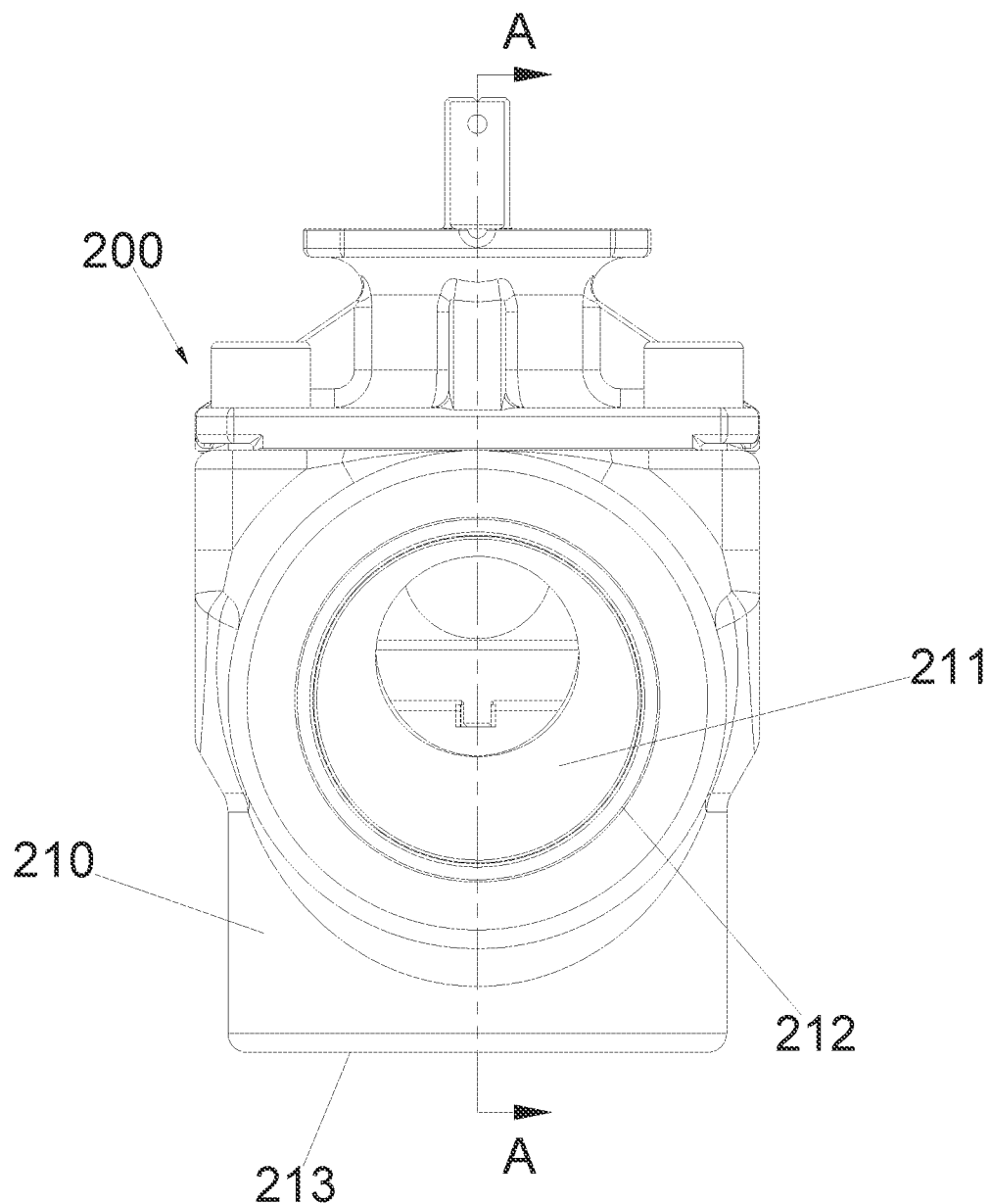
FIG. 18 depicts an end view of a first alternative embodiment valve assembly of the present invention.

FIG. 18 depicts an end view of a first alternative embodiment valve assembly 200 of the present invention. First alternative embodiment valve assembly 200 includes valve body member 210 having inner chamber 211 and first fluid inlet 212 and fluid outlet 213.

Figure 19:
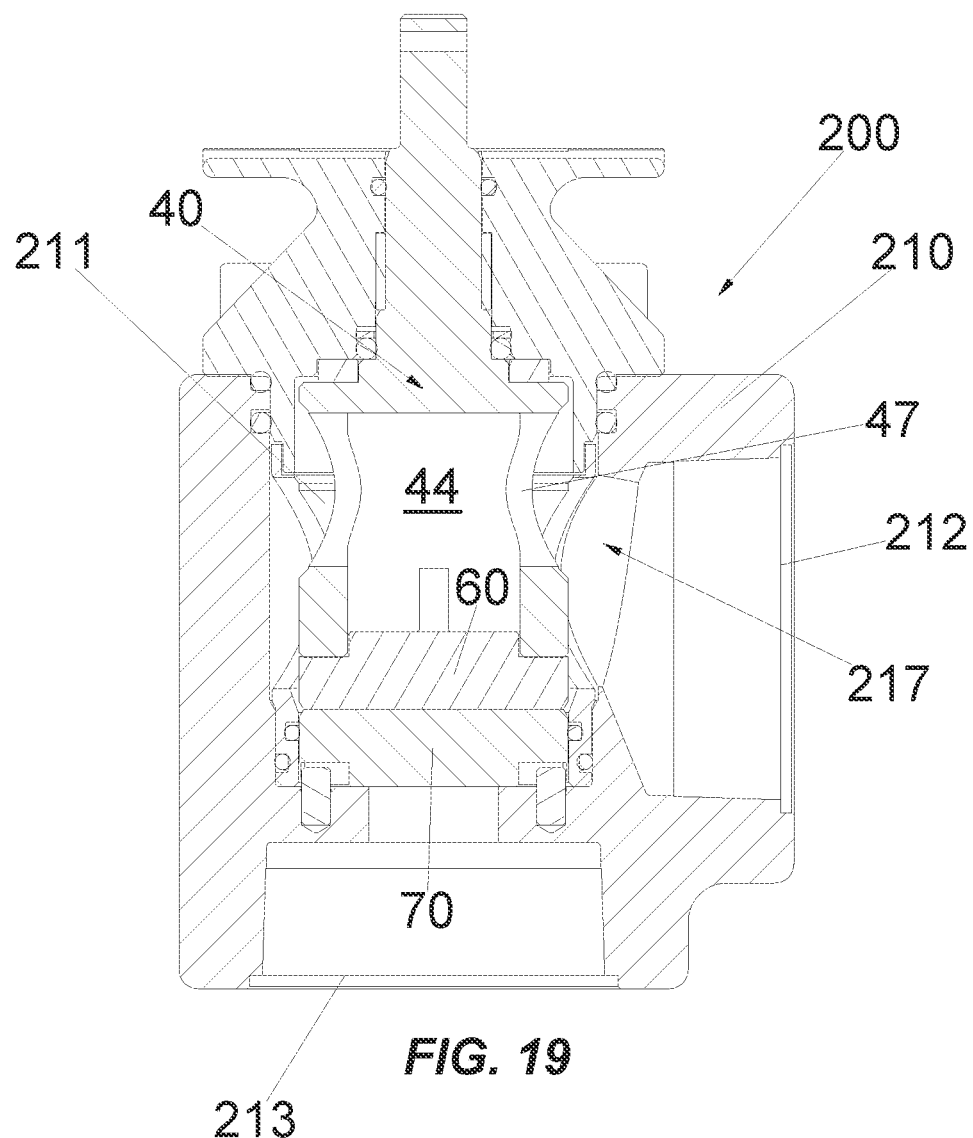
FIG. 19 depicts a side sectional view of first alternative embodiment valve assembly of the present invention along line A-A of FIG. 18.

FIG. 19 depicts a side sectional view of first alternative embodiment valve assembly 200 of the present invention along line A-A of FIG. 18. It is to be observed that first alternative embodiment valve assembly 200 of the present invention differs from valve assembly 100 primarily with respect to body member 210; other components of said first alternative embodiment valve assembly 200 are identical or substantially similar to those described previously in connection with valve assembly 100 and will not be extensively discussed again herein with respect to said first alternative valve assembly 200. Still referring to FIG. 19, body 210 further comprises inlet flow bore 217. In a preferred embodiment, said inlet flow bore 217 is oriented at an upward acute angle from horizontal and extends from fluid inlet 212 to inner chamber 211.

Pressurized fluid can enter first alternative valve assembly 200 through fluid inlet 212. Said fluid can flow through inlet flow bore 217 into inner chamber 211, through flow aperture 47 of inner rotator 40, and into inner recess 44 of said rotator 40. Said pressurized fluid can then flow through aligned sized aperture(s) of movable flow trim disk 60 and sized aperture(s) of stationary flow trim disk 70 (when said sized aperture(s) of said flow trim disks are at least partially aligned). Fluid flowing through aligned sized aperture(s) of flow trim disks 60 and 70 can flow out of first outlet 213.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A valve comprising:
   a) a housing having an inlet, a first outlet, a second outlet and an inner chamber, wherein said inlet and said first and second outlets are in fluid communication with said inner chamber;
   b) a valve rotator having a body section and a stem, wherein said body section is rotatably disposed within said inner chamber of said housing and said stem extends outside of said housing;
   c) a stationary orifice disk disposed within said inner chamber;
   d) a rotating orifice disk operationally attached to said valve rotator and engaged with said stationary orifice disk, wherein rotation of said valve stem of said valve rotator causes rotation of said rotating orifice disk relative to said stationary orifice disk; and
   e) a plug, wherein said plug can be selectively installed within said first outlet or said second outlet for blocking fluid flow through said first or second outlet.

2. The valve of claim 1, wherein said first outlet and said inlet are substantially in-line.

3. The valve of claim 1, wherein said second outlet is oriented at approximately ninety degrees relative to said inlet.

4. The valve of claim 1, further comprising a handle or actuator operationally attached to said stem of said valve rotator for imparting torque forces to said stem.

5. The valve of claim 1, wherein said plug further comprises an inner surface, an outer surface and a through-bore extending from said inner surface to said outer surface.

6. The valve of claim 5, further comprising a wear member obstructing said through-bore and forming a fluid pressure seal against said plug.

7. The valve of claim 6, further comprising a sensor for sensing when said fluid pressure seal is broken.

8. The valve of claim 7, wherein said sensor further comprises an elongate rod moveably disposed within said through-bore, and wherein said elongate rod extends beyond said outer surface of said plug when said fluid pressure seal is broken.

9. A valve comprising:
   a) a housing having a first side, a second side, a bottom, an inner chamber, an inlet extending through said first side, a first outlet extending through said bottom, and a second outlet extending through said second side, wherein said inlet and said first and second outlets are in fluid communication with said inner chamber;
   b) a valve rotator having a body section and a stem, wherein said body section is rotatably disposed within said inner chamber of said housing and said stem extends outside of said housing;
   c) a stationary orifice disk disposed within said inner chamber;
   d) a rotating orifice disk operationally attached to said valve rotator and engaged with said stationary orifice disk, wherein rotation of said valve stem of said valve rotator causes rotation of said rotating orifice disk relative to said stationary orifice disk; and
   e) a plug, wherein said plug can be selectively installed within said first outlet or said second outlet for blocking fluid flow through said first or second outlet.

10. The valve of claim 9, wherein said inlet and said second outlet are substantially in-line.

11. The valve of claim 9, wherein said first outlet is oriented at approximately ninety degrees relative to said inlet.

12. The valve of claim 9, further comprising a handle or actuator operationally attached to said stem of said valve rotator for imparting torque forces to said stem.

13. The valve of claim 9, wherein said plug further comprises:
   a) an inner surface, an outer surface and a through-bore extending from said inner surface to said outer surface; and
   b) a wear member obstructing said through-bore and forming a fluid pressure seal against said plug.

14. The valve of claim 13, further comprising a sensor for sensing when said fluid pressure seal is broken and fluid from said valve enters said through-bore.

15. The valve of claim 14, wherein said sensor further comprises an elongate rod moveably disposed within said through-bore and configured to extend beyond said outer surface of said plug when said fluid pressure seal is broken.

16. A valve comprising:
   a) a housing having a first side, a second side, a bottom, an inner chamber, an inlet extending through said first side, a first outlet extending through said second side, and a second outlet extending through said bottom, wherein said inlet and said first and second outlets are in fluid communication with said inner chamber, said inlet and said second outlet are substantially in-line, and said first outlet is oriented at approximately ninety degrees relative to said inlet;

b) a valve rotator having a body section and a stem, wherein said body section is rotatably disposed within said inner chamber of said housing and said stem extends outside of said housing;

c) a stationary orifice disk disposed within said inner chamber;

d) a rotating orifice disk operationally attached to said valve rotator and engaged with said stationary orifice disk, wherein rotation of said valve stem of said valve rotator causes rotation of said rotating orifice disk relative to said stationary orifice disk; and e) a plug, wherein said plug can be selectively installed within said first outlet or said second outlet for blocking fluid flow through said first or second outlet.

17. The valve of claim 16, wherein said plug further comprises:
   a) an inner surface, an outer surface and a through-bore extending from said inner surface to said outer surface; and
   b) a wear member obstructing said through-bore and forming a fluid pressure seal against said plug.

18. The valve of claim 17, further comprising a sensor for sensing when said fluid pressure seal is broken and fluid from said valve enters said through-bore.

19. The valve of claim 18, wherein said sensor further comprises an elongate rod moveably disposed within said through-bore and configured to extend beyond said outer surface of said plug when said fluid pressure seal is broken.

20. The valve of claim 16, further comprising a handle or actuator operationally attached to said stem of said valve rotator for imparting torque forces to said stem.

* * * * *